¹ 2,844,623

2,844,623
DIAMMONIUM ETHYLENE BISDITHIO-CARBAMATE

Elmer A. Fike, Nitro, W. Va., assignor to Roberts Chemicals, Inc., Nitro, W. Va., a corporation of West Virginia No Drawing. Application April 1, 1955
Serial No. 498,757

3 Claims. (Cl. 260—500)

This invention relates to diammonium ethylene bisdithiocarbamate. It is a new compound and is claimed herein as such. The invention also includes the manufacture of the compound, also preparation of metal salts therefrom to be used as fungicides and the simultaneous production of an ammonium salt and its use as a fertilizer.

Disodium ethylene bisdithiocarbamate is known as nabam. The metal salts of nabam, prepared by mixing nabam with metal salts of inorganic acids, have been widely used as fungicides. The zinc salt is most widely used, and is prepared from zinc sulfate. Other salts have been used, such as iron, manganese, copper, etc. The metal salts of nabam are usually prepared from metal sulfates, but salts of other acids may be used such as chlorides, nitrates, etc.

The zinc salt and other metal salts have been used in aqueous solution for the treatment of both vegetables and fruits. The metal salts are produced by reacting the sodium salt which is nabam, with a metal salt such as zinc sulfate, etc., in aqueous solution and using the resultant aqueous reaction mixture as the fungicide.

The metal salts, and particularly the zinc salt, have been used for treatment of the following fungus growths, in the manner indicated:

Tomatoes: Early and late blight, anthracnose, stemphylium and septoria leaf spots.
    Spraying is begun when the disease is first reported in an area and the application is repeated at 7 to 10-day intervals or oftener under severe late blight conditions.
Potatoes, eggplants, peppers: Early and late blight.
    Application is made at 7 to 10-day intervals or oftener under severe late blight conditions. DDT or methoxychlor or other insecticides may be included as needed. It is effective on seed piece decay on potatoes.
Onions: Downy mildew. Application at 7 to 10-day intervals.
Snap beans and lima beans: Downy mildew, rust.
    Application begun when disease threatens.
Beans: Anthracnose.
    Applications are begun after the first blossoms appear, and are made at 7 to 10-day intervals.
Corn: Helminthosporium, leaf blight, puccinia rust.
    Applications at 5 to 7-day intervals, according to local recommendations.
Beets: Downy mildew, cercospora leaf spot.
    Applications at 7 to 10-day intervals.
Celery: Early and late blight.
    Spraying begun in the plant bed when plants first come through the ground. Further applications are made at 4 to 6-day intervals until the plants are set in the field. Thereafter, field applications are made every 7 to 10 days.
Cabbage: Downy mildew; alternaria.
    Application at 7 to 10-day intervals.
Carrots: Leaf blight; cercospora leaf spot.
    Applications at 7 to 10-day intervals.

Spinach, lettuce: Downy mildew.
    Applications at 7 to 10-day intervals.
Cantaloupe, cucumbers, watermelon, and other cucurbits:
    Downy mildew, alternaria blight (macrosporium); anthroacnose; angular leaf spot. Applications at 7 to 10-day intervals.

For fruit, usually only the zinc salt is used. Although local schedules may vary, the following indicates the types of fruit and fungi treated:

Apples: Scab, cedar rust.
    Sulfur is generally used with the zinc salt throughout the season, although it may be omitted following the blooming of the apples.
Cherries: Leaf spot; shot hole.
    Applied 3 to 5 times during the season.
Grapes: Bunch rot; downy mildew.
    Sprayed regularly according to local conditions.
Strawberries: Leaf spot.
    Applied when new growth starts in spring and repeated at 10-day intervals.
    Leaf scorch.
    2 or 3 applications in new beds in late summer.

Other plants on which the materials herein described may be used as fungicides include tobacco, hops, delphenium, carnations, hollyhocks, snapdragons, gladioli, azaleas, camellias, roses, pears, currants, pecans, raspberries, blackberries (and other rubus), etc.

The fungicides are valuable in attacking anthracnose, rust, mildews, stemphylium, blights, etc., whatever the host.

To secure improved distribution on celery, onions, cabbage, tomatoes, fruits, and possibly other crops, it may be desirable to add some wetting and sticking agents to the spray. Pesticides may be included.

It is customary to spray the plants with aqueous suspensions containing .05 to 0.3 percent of the zinc or other metal salt in aqueous suspension. Such suspensions prepared from the ammonium salt of this invention will include ammonium sulfate or other salt obtained in the zinc sulfate, etc., reaction. The ammonium salt of this invention, dissolved in the water solution, on application to any plant will be absorbed by the plant and fertilize it. Sodium sulfate or other sodium salt prepared from the sodium nabam has little or no fertilizer value.

The chief advantage in using ammonium hydroxide for the preparation of the fungicide is that the ammonium ethylene bisdithiocarbamate is much more soluble in water than the sodium salt. The sodium salt is usually shipped as an aqueous solution. Substituting the ammonium salt, solutions of higher concentration will be shipped, saving on container costs, freight, and other handling charges. A 33 percent solution of the sodium salt begins to crystallize out at 73° F., and at 16° F. the 19 percent solution (commercial strength) begins to freeze, whereas a 40 percent solution of the ammonium salt remains in solution at temperatures as low as 10° F. Thus solutions of the ammonium salt of 40 percent concentration (calculated as anhydrous) or greater may be used commercially and stored at winter temperatures, whereas it is not practical to ship the sodium salt (nabam) at concentrations of greater than 20 percent.

Generally, the ammonium salt will be shipped in solutions of at least about 40 percent concentration. More generally, it might be said that concentrations of 30 to 50 percent will be commercial. The maximum concentration will depend somewhat upon the climate. Thus, in the south, higher concentrations will be commercial, and in the north, where lower temperatures prevail, lower concentrations will be commercial, at least during the winter months when the surplus from a preceding season will be stored, and even during the early spring months when the first shipments of the season will be made.

The preparation of the ammonium salt is conveniently carried out by using the reaction shown in the following equation where the figures in parentheses indicate the amount of each reactant and product:

$2NH_4OH(70) + C_2H_4.(NH_2)_2(60) + 2CS_2(152) =$
$NH_4.SSC.NH.C_2H_4.NH.CSS.NH_4(246) + 2H_2O(36)$

Two hundred forty-one grams of 29 percent ammonium hydroxide (2 moles), 70 grams of 85.9 percent ethylenediamine (1 mole), and 152 grams of water were charged into a 1-liter flask. Then 152 grams of carbon disulfide were fed to the flask in one hour with agitation and cooling to maintain the temperature at 30–35° C. When all of the carbon disulfide had been fed into the flask, some of it settled to the bottom of the flask when agitation was stopped, but after an additional hour of agitation at 35–38° C. all of the carbon disulfide was reacted. This resulted in an orange-red solution that changed to a yellow-green color on standing overnight. The yield was 615 grams, including 10 grams of water in the ethylenediamine, 171 grams of water in the ammonium hydroxide, and 152 grams of added water, and 36 grams of water produced in the reaction, making a total of 359 grams (20 moles) of water present. The product was analyzed (according to the method on page 1842 of volume 23 of Analytical Chemistry by Clarke et al.) and found to contain 38.7 percent of the desired compound, diammonium ethylene bisdithiocarbamate instead of the theoretical 40 percent. Thus the yield was 96.8 percent of the theoretical.

The product of the foregoing example is described as the ammonium salt of 38.7 percent concentration in the reaction mixture. This is to be compared with an equivalent molecular concentration of 40.3 percent for the disodium salt. Solutions of the disodium salt of such concentration are not water soluble at the temperatures to which the commercial material is subjected, so that the sodium salt must be shipped in mixtures of greater water content. The disodium salt is generally shipped as a 19 percent aqueous preparation.

When the foregoing reaction is employed in the preparation of the disodium salt under the conditions above given for the preparation of the diammonium salt a yield of only about 85 percent is usual. The increased yield in the production of the diammonium salt is very substantial and represents a very appreciable cost saving.

PREPARATION AND USE OF FUNGICIDE AND FERTILIZER

It is customary in preparing the fungicide to react the aqueous reaction mixture of the disodium salt (nabam) with zinc sulfate or other metal salt as explained. An excess of the zinc sulfate or other metal salt is sometimes recommended because of its fungicidal effect. On reaction with nabam, sodium sulfate (or other sodium salt of a mineral acid) is produced. The sodium salt thus produced remains in the aqueous fungicidal suspension. When the suspension is sprayed onto the plant, the sodium sulfate or other sodium salt has no appreciable beneficial effect on the plant. When the ammonium reaction product is substituted for the sodium reaction product, as contemplated by this invention, ammonium sulfate, or other metal salt of a mineral acid) is produced when the spray solution is prepared. This ammonium sulfate or other ammonium salt thus produced has a beneficial fertilizing effect on the plant. This difference in the effect of the sodium and ammonium salts on the plant is one of the advantages of using the ammonium salt instead of the sodium salt commonly employed.

The spray solution may be used in different concentrations and different excesses of the zinc sulfate may be used in preparing the sprays. The zinc ethylene bisdithiocarbamate is less soluble than the sodium or ammonium salts and is, therefore, a more effective fungicide. It is customary to use some excess of zinc sulfate, etc., in order to convert all of the sodium or ammonium salt to the zinc, etc. derivative.

The following table illustrates the raw materials that are used in the preparation of different spraying solutions. The table refers to the use of the diammonium salt designated as D. A. E. B. (calculated as anhydrous) and anhydrous metal salts. When hydrates are employed correspondingly larger amounts will be used.

Table

| Spray Solution | Amount of D. A. E. B. | Metal Salt | Amount of Metal Salt | Amount of Water |
|---|---|---|---|---|
| A | 0.8 gram | ZnSO_4 | 0.7 gram | 1 liter |
| B | 0.6 lb | ZnSO_4 | 0.5 lb | 100 gal. |
| C | 1.0 lb | ZnSO_4 | 0.83 lb | 100 gal. |
| D | 0.8 lb | MnSO_4 | 0.7 lb | 100 gal. |
| E | 0.8 lb | CuSO_4 | 0.7 lb | 100 gal. |

Various additives may be employed as has been customary with spray solutions made from nabam as, for example, sulfur, DDT, spreading and sticking agents, etc.

The description is not intended to be limiting because diammonium ethylene bisdithiocarbamate may be used in fungicides wherever the sodium salt has been employed previously.

What I claim is:

1. Diammonium ethylene bisdithiocarbamate.

2. A package comprising an aqueous solution of diammonium ethylene bisdithiocarbamate of at least 30 percent concentration (calculated as anhydrous) in a shipping container.

3. The process of making a concentrated aqueous solution of diammonium ethylene bisdithiocarbamate from ethylene diamine, carbon disulfide and ammonium hydroxide which comprises reacting the foregoing in the presence of so little added water that together with the water formed in the reaction the resulting aqueous reaction mixture contains at least 30 percent (calculated as anhydrous) of diammonium ethylene bisdithiocarbamate.

References Cited in the file of this patent

UNITED STATES PATENTS

| | | |
|---|---|---|
| 897,624 | Jarboe | Sept. 1, 1908 |
| 1,972,961 | Tisdale | Sept. 11, 1934 |
| 2,317,765 | Hester | Apr. 27, 1943 |
| 2,457,674 | Heuberger | Dec. 28, 1948 |
| 2,504,404 | Flenner | Apr. 18, 1950 |
| 2,545,948 | Flenner | Mar. 20, 1951 |